L. V. LEWIS.

SPEED CONTROLLING APPARATUS FOR RAILWAY VEHICLES.

APPLICATION FILED JAN. 19, 1917.

Reissued June 11, 1918.

14,481.

2 SHEETS—SHEET 1.

WITNESSES

P. Herman Wagner

Edwin L. Jones

INVENTOR

Lloyd V. Lewis by A. L. Vernalle

His Attorney

L. V. LEWIS.

SPEED CONTROLLING APPARATUS FOR RAILWAY VEHICLES.

APPLICATION FILED JAN. 19, 1917.

Reissued June 11, 1918.

14,481.

2 SHEETS—SHEET 2.

WITNESSES

A. Herman Wagner.

Edwin D. Jones

INVENTOR

Lloyd V. Lewis by A. L. Vencill his attorney

UNITED STATES PATENT OFFICE.

LLOYD V. LEWIS, OF EDGEWOOD BOROUGH, PENNSYLVANIA, ASSIGNOR TO THE UNION SWITCH AND SIGNAL COMPANY, OF SWISSVALE, PENNSYLVANIA, A CORPORATION OF PENNSYLVANIA.

SPEED-CONTROLLING APPARATUS FOR RAILWAY-VEHICLES.

14,481. Specification of Reissued Letters Patent. Reissued June 11, 1918.

Original No. 1,185,214, dated May 30, 1916, Serial No. 755,537, filed March 19, 1913. Application for reissue filed January 19, 1917. Serial No. 143,385.

*To all whom it may concern:*

Be it known that I, LLOYD V. LEWIS, a citizen of the United States, residing in Edgewood borough, in the county of Allegheny and State of Pennsylvania, have invented certain new and useful Improvements in Speed-Controlling Apparatus for Railway-Vehicles, of which the following is a specification.

My invention relates to speed controlling apparatus for railway vehicles.

I will describe one form of apparatus embodying my invention and will then point out the novel features thereof in claims.

Figure 1:
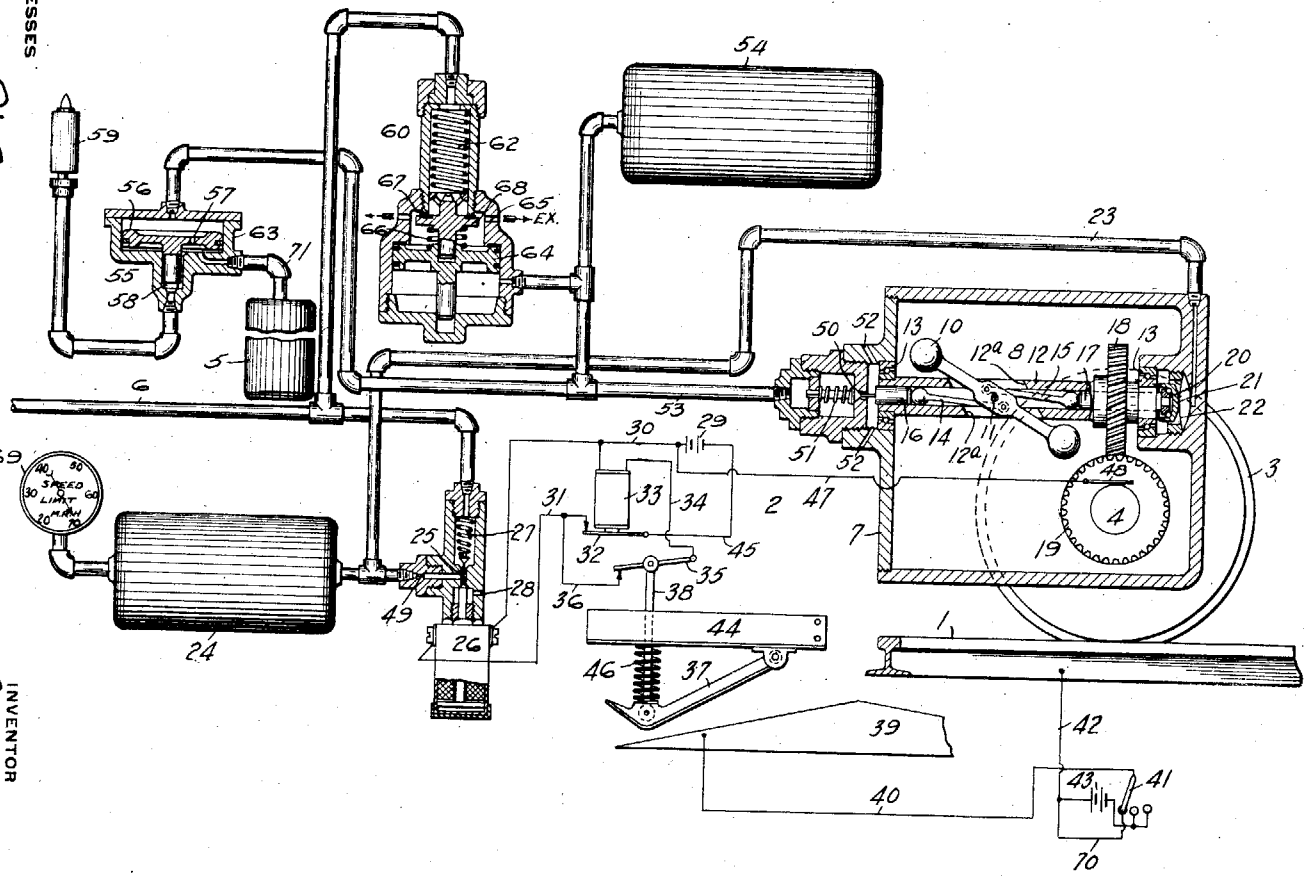
Figure 2:
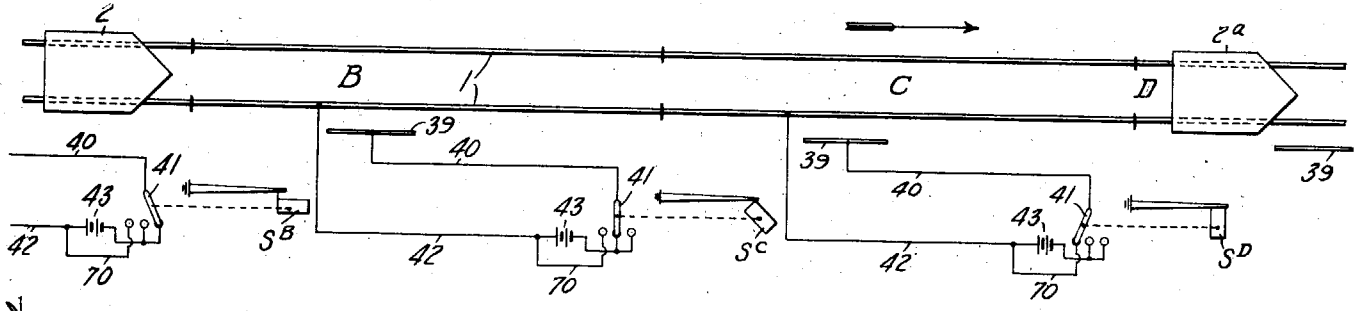

In the accompanying drawings Figure 1 is a view showing one form of apparatus embodying my invention applied to a railway vehicle. Fig. 2 is a diagrammatic view showing a portion of a railway having applied thereto one form of apparatus and circuits embodying my invention.

Similar reference characters refer to similar parts throughout the several views.

Referring now particularly to Fig. 1, the reference character 1 designates a track rail of a railway track upon which a vehicle 2 is adapted to travel. This vehicle may, for example, be a steam locomotive or an electric motor car; for purposes of simplifying the drawing, the only part of the vehicle proper which I have here shown is a wheel 3 and axle 4. The vehicle 2 is provided with a fluid pressure braking apparatus comprising as usual a main fluid pressure reservoir 5, and a brake pipe 6. It is understood that the reservoir 5 is supplied constantly with fluid pressure from a suitable source, such as an air compressor; and it is also understood that a reduction of pressure in the brake pipe causes an application of the brakes.

Mounted on the vehicle 2 is a inclosing box 7, which carries a centrifugal device 8 operated by the wheel 3. As here shown, this centrifugal device comprises a rod 9 pivotally mounted on trunnions 11 in a hollow shaft 12 provided with slots 12ª through which the rod 9 passes freely; the shaft 12 is mounted on ball bearings 13 in the box 7. Fixed to the shaft 12 is a helical gear 18 which meshes with a helical gear 19 fixed to the axle 4, so that the centrifugal device 8 is constantly operated from the wheel 3 of the vehicle. The rod 9 is provided with weights 10, 10. Pivoted to the rod 9 on opposite sides of the trunnions 11 are two links 14 and 15 which extend into the shaft 12 in opposite directions from the trunnions 11, and which abut against two heads 16 and 17, respectively, which heads are movable longitudinally in the shaft 12. It will be evident that while the vehicle is moving, the weights 10 tend to fly out from the positions in which they are shown, thereby tending to push the heads 16 and 17 outwardly toward the ends of the shaft 12.

The head 17 carries at its outer end a thrust bearing 20 upon the balls of which is mounted a cap 21 which may, therefore, remain stationary while the head 17 rotates. This cap 21 bears against one face of a diaphragm 22 mounted in the box 7. The other face of this diaphragm is exposed to fluid pressure in a pipe 23 which is connected with a reservoir 24. The reservoir 24 is connected with a brake pipe 6, or with atmosphere by a valve 25 according as this valve occupies one position or another; as here shown, this valve is of the double pin valve type, the structure and operation of which is so well known as to require no further explanation herein.

When the head 16 is pushed outwardly by the centrifugal device 8, it opens a valve 50 which then causes an application of the train brakes in a manner hereinafter explained. The tendency of the centrifugal device to fly out is resisted by fluid pressure supplied to the pipe 23 from the train pipe 6 as I will hereinafter explain, and the centrifugal device is so constructed that at any given speed it remains closed until the fluid pressure offering the resistance is reduced to a predetermined value. The centrifugal device then immediately opens to its extreme position, thus opening valve 50. In other words, the weights of the centrifugal device do not vary in position in accordance with the resisting force or in accordance with the speed of the train but they are fully open or fully closed according as the speed of the train is above or below a predetermined value. When the speed of the train rises above a given value as determined by the force resisting the centrifugal device, the balls immediately fly out and the train is brought to a stop.

The valve 25 is so controlled that it is usually in position to connect the reservoir 24 with the brake pipe 6, but that it may at times be reversed in position so as to disconnect the reservoir 24 from the brake pipe and connect the reservoir with atmosphere through port 28. The means for accomplishing this control may be of any suitable kind, and forms no part of my present invention; I will, however, now explain the control means which I have shown in the drawings. The valve 25 is biased by gravity and by a spring 27 to the second-mentioned position, that is, to such position that the reservoir is opened to atmosphere through port 28. Acting, however, in opposition to gravity and the spring 27 is an electromagnet 26 the action of which when energized is sufficient to move the valve to the position in which it is shown in the drawing, that is, to such position that the reservoir 24 is connected with the brake pipe 6. The magnet 26 is normally energized by the following circuit, all of which is carried by the vehicle—from battery 29 through wire 30, magnet 26, wire 31, armature contact 32 of a relay 33, wire 45 to battery 29. The relay 33 is normally energized by a closed circuit which may be traced as follows: from battery 29 through wire 30, relay 33, wire 34, contact 35, wire 36, armature contact 32, wire 45 to battery 29. The contact 35 is connected with a rod 38 which latter is connected with a shoe 37 adapted to be raised by the inclined surface of a trip 39 located in the trackway. The shoe 37 is biased by a spring 46 to such position that the contact 35 is closed, but when the shoe is raised by trip 39 it opens contact 35. The relay 33 is provided with an auxiliary circuit including a battery 43 and contact 41 located in the trackway. Contact 41 is adapted when in certain positions to connect battery 43 with both the ramp rail and the track rail, and when in another position to connect these rails by wires 40, 42 and 70. When the shoe 37 is raised by the trip 39, if the contact 41 is in such position as to connect battery 43 with both the ramp rail 39 and the track rail 1, the relay 33 continues to be energized by the following circuit—from battery 43 through contact 41, wire 40, trip 39, shoe 37, rod 38, contact 35, wire 34, relay 33, wires 30 and 47, brush 48, axle 4 and wheel 3, rail 1, wire 42 to battery 43. If, however, the contact 41 is in the other position, then when the shoe 37 is raised by trip 39, the opening of contact 35 deënergizes relay 33, which latter then opens the circuit of magnet 26, thereby allowing valve 25 to be reversed in position. The energizing circuit of relay 33 includes the armature contact of this relay, so that after being once opened, this circuit will not close; hence, the armature contact 32 must be closed by contact of the shoe 37 with an energized ramp rail 39 or by some suitable auxiliary means in order to again energize magnet 26.

As stated hereinbefore, the diaphragm 22 is acted upon in one direction by the centrifugal device 8, and in the other direction by fluid pressure in the reservoir 24, which latter is usually connected to the brake pipe 6 by the valve 25 but is at times disconnected from the brake pipe and opened to atmosphere. The decrease in pressure in reservoir 24 when the latter is open to atmosphere is rendered slow by an orifice 49 of restricted area interposed between the reservoir and the exhaust port 28.

The parts thus far described may be so proportioned that with a given pressure in the reservoir 24, for example, 70 pounds per square inch, when the speed of the vehicle is below a given value, such as 70 miles per hour, the fluid pressure on diaphragm 22 overcomes the pressure exerted on the diaphragm by the centrifugal device 8, and the latter remains closed; but when the speed reaches 70 miles per hour, the pressure exerted on the diaphragm by the centrifugal device overcomes the fluid pressure and the centrifugal device opens. The structure of the centrifugal device 8 is such that when the speed is again reduced to a given value such as 65 miles per hour the centrifugal device again closes. It will be evident, therefore, that if the pressure in the reservoir 24 is less than 70 lbs., the centrifugal device 8 will open at a speed lower than 70 miles per hour. Since the source of fluid pressure for the reservoir 24 is the brake pipe 6, it will be seen that a reduction of pressure in this pipe, which would render high speed running unsafe, will reduce the speed at which the centrifugal device opens.

The centrifugal device 8 may be employed to control any desired apparatus on the vehicle 2; as here shown, it is employed to control the fluid pressure brakes, in the manner which I will now explain.

Connected with the brake pipe 6 by means of a pipe 61 is a valve device 60 which is normally closed but which may at times be opened to reduce the pressure in the brake pipe and thereby cause an application of the brakes. This valve device 60 is controlled by the fluid pressure in a pipe 53 in such manner that when the pressure in pipe 53 is at or above a predetermined value, the valve device 60 is closed, but when pressure in pipe 53 falls below this value, the valve device 60 opens. The pipe 53 is supplied with fluid pressure from the reservoir 5 in a manner hereinafter explained, and is provided with a valve 50 which is usually closed but which is opened by the head 16 when the centrifugal device 8 opens. The valve 50 is biased to the closed position by the fluid pressure in pipe 53, and also by a spring 51 for a purpose hereinafter explained. When this valve is opened, the fluid in pipe 53 exhausts to atmosphere through ports 52. Connected with pipe 53 is a timing reservoir 54 for a purpose hereinafter explained.

The valve device 60 comprises a valve 68 which is adapted to seal on an annular valve seat 67 and thereby hold the brake pipe connection 61 closed. Valve 68 is biased to the open position by a spring 62, by the fluid pressure in pipe 61 and by gravity. It is held closed, however, by a piston 64 the under face of which is acted upon by the pressure in pipe 53. This piston seals against a gasket in the upper part of the cylinder. The area of this piston is much greater than the area of the valve 68, hence a considerably lower pressure in pipe 53 than in pipe 61 will hold valve 68 closed. Interposed between the piston 64 and the valve 68 is a spring 66, the purpose of which is to permit the valve 68 and the piston 64 to seal against their respective gaskets simultaneously. The pressure in pipe 53 when valve 50 is closed is, however, always as high as, or higher than, that in pipe 61, hence it will be seen that when pipe 53 is opened by valve 50, an interval of time will elapse before the pressure falls to such point that valve device 60 opens. This interval of time may be adjusted to any desired value by properly designing the volume of the timing reservoir 54, the area of the port through which valve 50 exhausts, and the area of port 57. I will assume for purposes of this specification that this interval of time is 10 seconds.

I have stated that the pipe 53 is supplied with fluid pressure from the reservoir 5. As here shown, this reservoir is connected with the pipe through a valve device 55, which latter also controls a whistle 59. The valve device 55 comprises a valve 58, which is controlled by a piston 56, movable in a cylinder 63 formed by the body of the valve device. The cylinder on one side of the piston is connected with the reservoir 5 by a pipe 71, and on the other side with pipe 53; the piston 56 is provided with a port 57. It will be seen that at all times except when piston 56 is at the upper end of its stroke, fluid from the reservoir 5 may flow into pipe 53 through the port 57. When valve 50 is closed, the piston 56 occupies the position in which it is shown, thereby holding valve 58 closed; the reason for this is that the underside of valve 58 is exposed to atmosphere whereas the entire upper face of the piston is exposed to fluid pressure from reservoir 5, so that the effective area of the upper face of the piston is greater than that of the lower face. When, however, the valve 50 in pipe 53 is opened, the reduction of pressure in pipe 53 causes a reduction of pressure on the upper face of piston 56 so that the latter immediately rises, thereby opening valve 58 and causing the whistle 59 to sound.

It will be seen from the foregoing that when valve 50 is opened, whistle 59 immediately begins to sound, and that after an interval of time—hereinbefore assumed to be 10 seconds—valve device 60 operates to cause an application of the brakes. It will also be evident from the foregoing that the speed of the vehicle at which the centrifugal device 8 will open, depends upon the fluid pressure in reservoir 24. When the pressure is high, for example, 70 pounds per square inch, as hereinbefore assumed, the speed may be high, for example, slightly less than 70 miles per hour, without causing the centrifugal device to open. A lower pressure, however, permits the centrifugal device to open at a lower speed; the maximum permissive speed may be indicted at all times to the driver of the vehicle by the provision of a pressure gage 69 connected with reservoir 24 and calibrated to read in miles per hour.

It will be apparent that if the fluid pressure on diaphragm 22 were the only force provided to counteract the tendency of the centrifugal device 8 to open, then when the pressure in reservoir 24 were reduced to atmospheric pressure, the slightest movement of the vehicle would cause the centrifugal device to open and to open valve 50, hence the vehicle would then be held at a standstill. To permit slow movement of the vehicle under this condition, I preferably provide the spring 51, and adjust it so that when the fluid pressure on diaphragm 22 is atmospheric, the vehicle may proceed at a low speed, such for example as 15 miles per hour, without causing centrifugal device 8 to open. This means that so far as the apparatus herein shown and described is concerned, the vehicle may always proceed at 15 miles per hour or less, even if the pressure in reservoir 24 is atmospheric.

It is, of course, essential that at certain points on a railway a vehicle should be brought to a stop and not be permitted to proceed past a signal indicating "stop." The apparatus herein shown and described has no provision for enforcing the indication of such a signal, but such provision can, when desired, be made by means of other apparatus, as is well understood in the art.

In Fig. 2 I have shown a portion of a railway divided into block sections A, B, C, D, etc., through which traffic moves in the direction indicated by the arrow. Block sections B, C and D are protected respectively by railway signals $S^B$, $S^C$ and $S^D$, each of which, as here shown, is adapted to give three indications, viz., "clear," "caution", and "stop." Located in each block section is a ramp rail 39, each of which is provided with a portion of an auxiliary circuit similar to that hereinbefore explained in connection with Fig. 1. As here shown, the contact 41 for each ramp rail is operated by the signal for the next succeeding block section.

I will now explain the operation of the entire apparatus, referring to both views.

In Fig. 2, block section D is occupied by a vehicle $2^a$, and block section A by a vehicle 2. It is understood that at least vehicle 2 is equipped with apparatus similar to that shown in Fig. 1. Since block section D is occupied, signal $S^D$ indicates stop, and since block sections C and B are unoccupied, signal $S^C$ indicates caution and signal $S^B$ indicates clear. I will assume that vehicle $2^a$ is at rest and that vehicle 2 is moving. As vehicle 2 proceeds through block section B and passes over ramp rail 39 in this block, relay 33 is not deënergized because contact 41 operated by signal $S^C$ is in such position as to connect battery 43 with both this ramp rail and a track rail 1. Hence, the vehicle 2 may proceed through block section B at full speed. Contact 41 operated by signal $S^D$ is, however, in such position that the ramp rail 39 in block section C is deënergized, hence as vehicle 2 passes over this ramp rail its relay 33 is opened, thereby deënergizing magnet 26, which permits valve 25 to reverse, thereby disconnecting reservoir 24 from pipe 6 and connecting the reservoir with atmosphere. The fluid pressure on the diaphragm 22, therefore, gradually decreases in proportion to the lapse of time, in accordance with the well known law of the flow of fluid through an orifice. When this pressure has reached a certain value, depending on the speed of the vehicle, the action of the centrifugal device 8 overcomes the total effect of the fluid pressure on diaphragm 22 and of the fluid pressure and the spring 51 on valve 50, and the centrifugal device then opens, thereby opening valve 50. It is evident that the distance which the vehicle travels after passing ramp rail 39 before the centrifugal device opens, varies according to the speed; if the speed is high, then only a slight reduction of fluid pressure is necessary to permit the centrifugal device to open, and, therefore, only a short interval of time elapses before the device opens; whereas, if the speed is low, a considerable reduction of fluid pressure is necessary to permit the centrifugal device to open, hence a considerable period of time elapses before the device opens. Hence, at high speed the valve 50 is opened only a short distance after the ramp rail is passed, and at low speed the valve is not opened until the vehicle has traveled a considerable distance beyond the ramp rail. The result is that at high speeds the brakes will be applied sooner than at low speeds; the parts may be so adjusted and the ramp rails 39 may be so located that regardless of speed the vehicle will be brought to a stop at approximately the same point, which point is preferably a short distance in the rear of the next signal—which in Fig. 2 is signal $S^D$.

Immediately upon the opening of valve 50, the whistle 59 will begin to sound; then after an interval of ten seconds, valve device 60 will operate to cause an application of the brakes. If during this interval the driver of the vehicle should apply the brakes and reduce the speed of the vehicle to the point at which the centrifugal device closes, valve device 60 will, of course, not be operated. That is, if the driver heeds the warning given by the whistle 59, the valve device 60 need never operate to cause an automatic application of the brakes. If, however, the warning given by the whistle is not heeded, and valve device 60 operates to apply the brakes, then as soon as the speed of the vehicle is reduced to that permitted by the pressure in reservoir 24, valve device 60 will again close and as soon as pressure is again restored in brake pipe 6 the brakes will be released. This apparatus embodying my invention comprises, therefore, means for releasing the brakes after an automatic application thereof, after the speed of the vehicle has been reduced to the speed permitted by the apparatus.

It will be seen from the foregoing, that I have provided apparatus which will, under conditions of safety, impose a continuous high speed limit, and under conditions of caution will impose a continuous low speed limit, and which, when a danger point is being approached, will cause a gradual decrease of speed limit from the high limit to the low limit in such a manner that if at any time during such decrease the permissive speed is exceeded, the vehicle will be brought to a stop at substantially the same point outside the zone of danger.

I do not claim as my invention the combination of a centrifugal device operated by a wheel of a vehicle, fluid pressure tending to hold the centrifugal device closed, and means operated by the centrifugal device when the latter opens for controlling the vehicle, this combination being disclosed and claimed in a co-pending application by Frank H. Nicholson, filed March 19, 1913, Serial No. 755,528.

Although I have herein shown and described only one form and arrangement of apparatus embodying my invention, it is understood that various changes and modifications may be made therein within the scope of the appended claims without departing from the spirit and scope of my invention.

Having thus described my invention, what I claim is:

1. Controlling apparatus for vehicles comprising a centrifugal device operatively connected with an axle of a vehicle, fluid pressure on the vehicle acting in opposition to the centrifugal device, means on the vehicle for permitting a gradual reduction of fluid pressure in accordance with lapse of time, and means controlled by the centrifugal device when the latter overcomes the said fluid pressure for controlling the vehicle.

2. Controlling apparatus for vehicles comprising a centrifugal device operated by the movement of the vehicle, fluid pressure on the vehicle acting in opposition to the centrifugal device, means on the vehicle for permitting a gradual reduction of fluid pressure in accordance with lapse of time, and means controlled by the centrifugal device when the latter overcomes the said fluid pressure for controlling the vehicle.

3. Controlling apparatus for vehicles comprising a centrifugal device operatively connected with an axle of a vehicle, fluid pressure on the vehicle acting in opposition to the centrifugal device, means for permitting reduction of said fluid pressure through an orifice of restricted area, and means responsive to opening of said centrifugal device for controlling the vehicle.

4. Apparatus for controlling railway vehicles comprising a centrifugal device operated by an axle of a vehicle, fluid pressure on the vehicle acting in opposition to said centrifugal device, means independent of the fluid pressure for exerting a comparatively small force on the centrifugal device in the same direction as the action of the fluid pressure, means for permitting reduction of said fluid pressure, and means responsive to the centrifugal device for controlling the vehicle when the pressure exerted by the centrifugal device is sufficient to overbalance the sum of the pressure of the fluid and the pressure exerted by said independent means.

5. Speed controlling apparatus for vehicles comprising a centrifugal device operated by an axle of the vehicle, fluid pressure on the vehicle tending to hold the centrifugal device closed, means for permitting reduction of said fluid pressure through an orifice of restricted area, means for exerting sufficient pressure on the centrifugal device to hold the latter closed when the speed of the vehicle is low and the fluid pressure acting on the centrifugal device is atmospheric, and means responsive to opening of the centrifugal device for controlling the vehicle.

6. Speed controlling apparatus for vehicles comprising a centrifugal device operated by an axle of the vehicle, fluid pressure tending to hold the centrifugal device closed, means for permitting reduction of said fluid pressure, means for indicating to the driver of the vehicle the pressure of said fluid, and means responsive to opening of the centrifugal device for controlling the vehicle.

7. Speed controlling apparatus for vehicles comprising a centrifugal device operated by the movement of the vehicle, fluid pressure tending to hold the centrifugal device closed, means for permitting reduction of said fluid pressure, means for indicating to the driver of the vehicle the pressure of said fluid, and means responsive to opening of the centrifugal device for controlling the vehicle.

8. Speed controlling apparatus for vehicles comprising a source of fluid pressure and a reservoir on the vehicle, means for connecting the reservoir with the said source or disconnecting the reservoir from said source and permitting gradual reduction of the pressure in the reservoir through a restricted orifice, a centrifugal device driven by an axle of the vehicle and acting in opposition to the pressure in the reservoir, and means responsive to opening of the centrifugal device for controlling the vehicle.

9. Speed controlling apparatus for railway vehicles comprising a source of fluid pressure on a vehicle, a reservoir on the vehicle normally connected with the source, a centrifugal device operated by an axle of the vehicle and acting in opposition to the pressure in the reservoir, means on the vehicle for disconnecting the reservoir from the source and permitting gradual reduction of the reservoir pressure through a restricted orifice, means located in the trackway and adapted to at times cause operation of said means, and means responsive to opening of the centrifugal device for controlling the vehicle.

10. Speed controlling apparatus for vehicles comprising a source of fluid pressure and a reservoir on the vehicle, means for connecting the reservoir with the said source or disconnecting the reservoir from said source and permitting gradual reduction of said reservoir pressure through a restricted orifice, a centrifugal device driven by an axle of the vehicle and acting in opposition to the pressure in the reservoir, means for holding the centrifugal device closed when the pressure in the reservoir is atmospheric and the speed of the vehicle is low, and means responsive to opening of the centrifugal device for controlling the vehicle.

11. Controlling apparatus for vehicles, comprising a centrifugal device operated by a wheel or axle of the vehicle, fluid pressure on the vehicle acting in opposition to the centrifugal device, means for gradually varying the pressure of said fluid in accordance with lapse of time, and means controlled by said centrifugal device for controlling the vehicle.

12. A speed controlling apparatus for railways comprising a signal, a trip located in the rear of the signal, means for rendering said trip operative or inoperative according as the signal indicates stop or proceed, a source of fluid pressure on a vehicle, a reservoir on the vehicle normally connected with said source, means on the vehicle controlled by said trip when the latter is operative for disconnecting the reservoir from the source and connecting the reservoir with atmosphere thereby permitting reduction of pressure in the reservoir; a centrifugal device operated by a wheel of the vehicle and acting in opposition to the fluid pressure in the reservoir, and means responsive to opening of the centrifugal device for controlling the vehicle.

13. A speed controlling apparatus for vehicles comprising a source of fluid pressure and a reservoir on the vehicle, a centrifugal device operated by an axle of the vehicle and acting in opposition to the fluid pressure in the reservoir, a valve device adapted to connect said reservoir with the source of fluid pressure or with atmosphere according as it occupies one position or another, said valve being normally held in the first of said positions, means located in the trackway for at times causing said valve device to be moved to the second position, and means affected by the centrifugal device for controlling the vehicle when the action of the centrifugal device overbalances the fluid pressure.

14. Speed controlling apparatus for railway vehicles comprising a centrifugal device on the vehicle, a member moved longitudinally by the weights of said device, a source of fluid pressure on the vehicle acting in opposition to the movement of said member corresponding to the outward movement of the weights, means on the vehicle for permitting gradual decrease of said fluid pressure, a device in the trackway for causing operation of said means, and means affected by outward movement of the weights for controlling the vehicle.

15. In combination, a vehicle, brakes therefor, a warning signal device on the vehicle, a fluid pressure reservoir on the vehicle, means responsive to a certain reduction of pressure in said reservoir for causing operation of said warning signal, means responsive to a greater reduction of pressure in said reservoir for causing application of the brakes, and means for permitting gradual reduction of pressure in said reservoir, whereby an interval of time elapses between the operation of the warning signal and the application of the brakes.

16. In combination, a vehicle, brakes therefor, a reservoir on the vehicle, means for supplying fluid pressure to said reservoir, an orifice of small area for said reservoir, means for opening the reservoir to atmosphere through said orifice thereby permitting gradual reduction of pressure in said reservoir, means controlled by a slight reduction of pressure in said reservoir for giving a warning signal, and means controlled by a considerable reduction of pressure for causing an application of said brakes, whereby a period of time intervenes between the warning signal and the application of the brakes.

17. In combination, a vehicle, brakes therefor, a reservoir on the vehicle, means for supplying fluid pressure to said reservoir, an orifice of small area for said reservoir, means for opening the reservoir to atmosphere through said orifice thereby permitting gradual reduction of pressure in said reservoir, a warning signal on the vehicle, a valve biased to the open position which valve is held closed by the fluid pressure in said reservoir but is opened when the fluid pressure in the reservoir is considerably reduced, and which valve is adapted when opened to cause an application of the brakes, and means responsive to a slight reduction of fluid pressure in the reservoir for causing an operation of said warning signal.

18. In combination, a vehicle, brakes therefor, a warning signal on the vehicle, a fluid pressure reservoir on the vehicle, means responsive to a certain change of pressure in said reservoir for causing operation of said warning signal, means responsive to a greater change of pressure in said reservoir for causing application of the brakes, and means for causing a gradual change of pressure in said reservoir, whereby an interval of time elapses between the operation of the warning signal and the application of the brakes.

19. In combination, a railway vehicle, a speed-responsive device thereon, a fluid pressure receptacle, means for causing gradual variation of the pressure in said receptacle in accordance with lapse of time, and vehicle-governing means controlled by said speed-responsive device and by the fluid pressure in said receptacle.

20. A speed controlling apparatus for railway vehicles comprising a source of fluid pressure on the vehicle, a reservoir normally connected with said source, means for disconnecting said reservoir from the source of fluid pressure and connecting the reservoir with atmosphere through a restricted orifice thereby permitting a gradual reduction of pressure in the reservoir; means located in the trackway for at times causing operation of said means, a centrifugal device operated by an axle of the vehicle and acting in opposition to the fluid pressure in the reservoir, a second reservoir on the vehicle, means for supplying the second reservoir with fluid pressure, a valve connected with said second reservoir and opened by the centrifugal device when the latter overcomes the fluid pressure acting against it, means responsive to a slight reduction of pressure in the second reservoir for causing a warning signal to be given on the vehicle, and means responsive to a considerable reduction of pressure in said second reservoir for causing an application of the brakes of the vehicle.

21. In combination, a railway vehicle, a movable member thereon, fluid pressure acting on said member, speed-responsive means operated by a wheel or axle of the vehicle for exerting pressure on said member in opposition to the fluid pressure, means for gradually varying the pressure of said fluid on the member in accordance with lapse of time, and vehicle governing means controlled by said member.

22. Controlling apparatus for railway vehicles, comprising a speed-responsive device operatively connected with a wheel of the vehicle, means on the vehicle adapted to vary in accordance with lapse of time, means located in the trackway and adapted to set said time-varying means into operation, and means controlled by coöperation of said speed-responsive device and said time-varying means for controlling the vehicle.

23. Speed controlling apparatus for vehicles comprising a movable member on the vehicle, means for exerting a force on said member in one direction varying in accordance with the speed of the vehicle, means for exerting an opposing force on said member varying in accordance with lapse of time, and traffic controlling means on said vehicle controlled by said movable member.

In testimony whereof I affix my signature in presence of two witnesses.

LLOYD V. LEWIS.

Witnesses:
A. Herman Wegner,
Frank T. Leilich.